United States Patent
Gravelle et al.

(10) Patent No.: US 7,769,963 B1
(45) Date of Patent: Aug. 3, 2010

(54) RF TAG SYSTEM WITH SINGLE STEP READ AND WRITE COMMANDS

(75) Inventors: Kelly Gravelle, San Diego, CA (US);
Dale L. Scott, Albuquerque, NM (US);
Robert W. Tiernay, Albuquerque, NM (US)

(73) Assignee: TC License Ltd., Hummelstown, PA (US)

(*) Notice: Subject to any disclaimer, the term of this patent is extended or adjusted under 35 U.S.C. 154(b) by 155 days.

(21) Appl. No.: 11/053,679

(22) Filed: Feb. 9, 2005

(51) Int. Cl.
*G06F 12/00* (2006.01)
*G06F 13/00* (2006.01)
*G06F 13/28* (2006.01)

(52) U.S. Cl. .................. 711/154; 711/167; 711/170; 711/E12.001; 340/10.1; 340/10.3; 340/10.32

(58) Field of Classification Search ............ None
See application file for complete search history.

(56) References Cited

U.S. PATENT DOCUMENTS

| | | | |
|---|---|---|---|
| 4,691,202 A * | 9/1987 | Denne et al. ............. 340/10.2 |
| 5,410,315 A * | 4/1995 | Huber .................... 340/10.32 |
| 5,521,601 A | 5/1996 | Kandlur et al. |
| 5,521,602 A * | 5/1996 | Carroll et al. ........... 340/10.41 |
| 5,550,547 A | 8/1996 | Chan et al. |
| 5,673,037 A * | 9/1997 | Cesar et al. ............. 340/10.32 |
| 5,929,779 A * | 7/1999 | MacLellan et al. ....... 340/10.2 |
| 5,942,987 A * | 8/1999 | Heinrich et al. ......... 340/10.42 |
| 5,995,019 A | 11/1999 | Chieu et al. |
| 6,079,619 A * | 6/2000 | Teraura et al. ............ 235/380 |
| 6,288,629 B1 * | 9/2001 | Cofino et al. ............. 340/10.1 |
| 6,288,936 B1 * | 9/2001 | Kawamura ............ 365/185.03 |
| 6,412,086 B1 * | 6/2002 | Friedman et al. .......... 714/733 |
| 6,919,793 B2 * | 7/2005 | Heinrich et al. ......... 340/10.32 |
| 2002/0118097 A1 * | 8/2002 | Heinrich et al. ......... 340/10.32 |
| 2003/0067504 A1 * | 4/2003 | Spurr et al. ................. 347/19 |
| 2005/0057995 A1 * | 3/2005 | Mitani et al. ............. 365/222 |
| 2005/0088286 A1 * | 4/2005 | Heinrich et al. ......... 340/10.51 |
| 2006/0010302 A1 * | 1/2006 | Yamamoto et al. ......... 711/163 |
| 2006/0179391 A1 * | 8/2006 | Rodriguez et al. ......... 714/749 |

* cited by examiner

*Primary Examiner*—Matt Kim
*Assistant Examiner*—Matthew R Chrzanowski
(74) *Attorney, Agent, or Firm*—Caesar, Revise, Bernstein, Cohen & Pokotilow, Ltd.

(57) ABSTRACT

A system has a read command signal that includes an Address field, Byte Data field, and Starting Address field. If the tag data read from the memory address identified by the Address field is the same as the Byte Data, the tag sends a response signal with Page Data read from the memory location identified by the Starting Address field and the tag ID. A write command signal includes an Address field, Byte Data field, Starting Address field, and Page Data field. If the tag data is the same as the Byte Data, the tag writes the data from the Page Data field to the memory location identified by the Starting Address field. Accordingly, data is read from and written to the tags in a single step, and the reader need not wait for the tag to respond with a tag ID before requesting that data be read from or written to that tag.

14 Claims, 3 Drawing Sheets

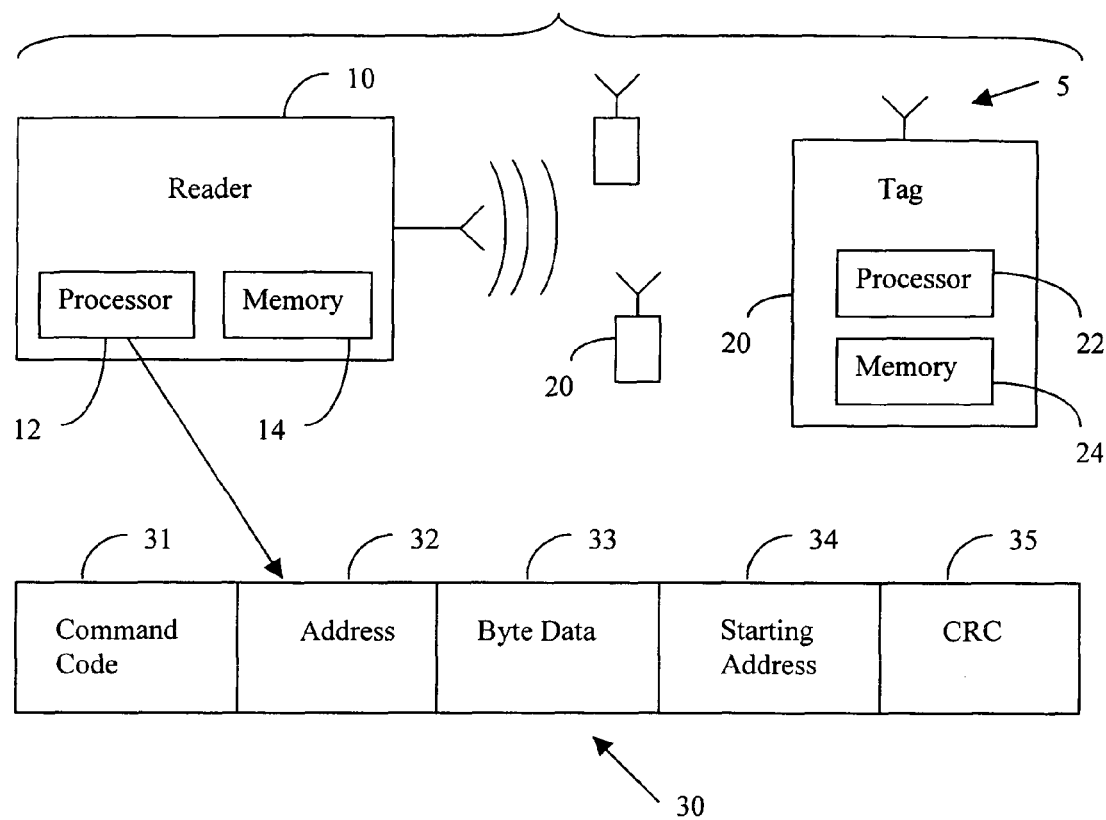
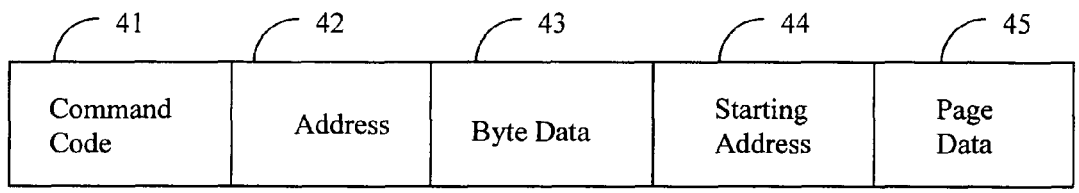
Figure 2

RF TAG SYSTEM WITH SINGLE STEP READ AND WRITE COMMANDS

BACKGROUND OF THE INVENTION

1. Field of the Invention

The present invention relates to an RF tag system having commands for reading and writing data. More particularly, the present invention relates to an RF tag system having group commands that reduce the number of steps needed to read data from a tag or write data to the tag.

2. Background of the Related Art

An RF tag system generally has a reader, also referred to as an interrogator or a base station, and tags that communicate with the reader using RF (radio frequency) signals. RF tag systems are shown, for instance, in U.S. Pat. Nos. 5,942,987 to Heinrich et al., 5,673,037 to Cesar et al., 5,550,547 to Chan et al., and 5,521,601 to Kandlur et al.

If the reader desires to read data from a specific tag, the reader will transmit a Group Select command addressed to all the tags, or a group of tags, requesting a response. The tags will each respond with its tag identification (ID), which identifies the specific tag to the reader. The reader then transmits a Read command having the tag ID of the desired tag. The specified tag will transmit a response signal, with the requested data. For a tag having a 40 Kbps data rate, it takes approximately 3.35 ms for the reader to transmit the Group Select command, 2.8 ms for the tag to issue a response, 3.15 ms to send the Read command, and another 2.8 ms for the tag to respond. Accordingly, the total transaction time is about 12.10 ms for a tag having a 40 Kbps data rate.

If the reader desires to write data to a specific tag, the reader will transmit a Group Select command addressed to all the tags, or a group of tags, requesting a response. The tags will each respond with its tag ID. The reader then transmits a Write Byte command having the desired tag ID and a first byte of data to be written to the tag. The tag acknowledges that it received a write data command and then writes the data to its memory (usually an EEPROM). The reader then sends a Verify Byte command, which contains the tag ID and the address location of the byte of data that is being verified. The tag responds by reading the byte of data that was written to the memory and sending a Verify Byte Response with that byte of data that was written to the memory. The process repeats for each byte of information to be written to the tag.

A typical write process is for eight bytes, which means that the Write Byte—Write Byte Response—Verify Byte—Verify Byte Response cycle is performed a total of eight times.

For a tag having a 40 Kbps data rate, it takes 3.35 ms for the Group Select command, 2.8 ms for the response, 3.35 ms for the Write Byte command, 1.4 ms for the Write Byte Response, 15 ms to write the byte to the tag, 3.15 ms for the Verify Byte command, and 1.4 ms for the Verify Byte Response. Accordingly, the total transaction time for an 8-byte write operation at a 40 Kbps data rate is 200.55 ms.

SUMMARY OF THE INVENTION

It is an object of the invention to reduce the amount of time required for reading data from a tag. It is another object of the invention to reduce the amount of time required for writing data to a tag. It is a further object of the invention to provide a single step for reading data from a tag. It is a further object of the invention to provide a single step for writing data to a tag. It is another object of the invention to provide a system for reading data from, and writing data to, a tag that does not require any preceding commands. It is yet another object of the invention to provide a system that can be used for a variable fee toll road which charges a toll fee based upon the entry and exit locations of a particular vehicle.

A system is provided having a read command signal sequence that identifies a group of tags and a memory address from which the designated tags are to return Page Data. The read command signal sequence includes an Address field, Byte Data field, and Starting Address field. The Address field identifies the memory address at which the tag data is to be read and compared to the Byte Data. If the tag data is the same as the Byte Data, the tag responds to the read command signal with tag ID and the Page Data read from the memory location identified by the Starting Address field. If the tag data is not the same, then the tag is not one of the tags designated by the reader to respond to the command, and the tag does not respond.

The system also includes a write command signal sequence that identifies a group of tags and the Page Data to be written to the designated tags. The write command signal sequence includes an Address field, Byte Data field, Starting Address field, and Page Data field. If the tag data at the memory location identified by the Address field is the same as the Byte Data, the tag writes the data from the Page Data field to the memory location identified by the Starting Address field.

Accordingly, the invention provides that the read command signal sequence be sent to the tags for tag ID and data to be read from the designated tags. Thus, the read is accomplished in a single step, and the reader need not wait for the tag to respond with a tag ID before requesting that data be read from that tag. In addition, the invention provides that the write command signal sequence be sent to the tags for data to be written to the designated tags. Thus, the data write is accomplished in a single step, and the reader need not wait for the tag to respond with a tag ID before requesting that the data be written to the tag.

The single step read and write commands reduce the number of signals that need to be transferred between the reader and the tags. As a result, the reader is able to increase throughput. In addition, the time to read data from and write data to the tags is substantially reduced.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1 is a block diagram showing the tag system with a command signal sequence used to read Page Data from the tags in accordance with the preferred embodiment of the invention;

FIG. 2 is a block diagram showing the command signal sequence used to write Page Data to the tags;

DETAILED DESCRIPTION OF THE PREFERRED EMBODIMENTS

Figure 3:
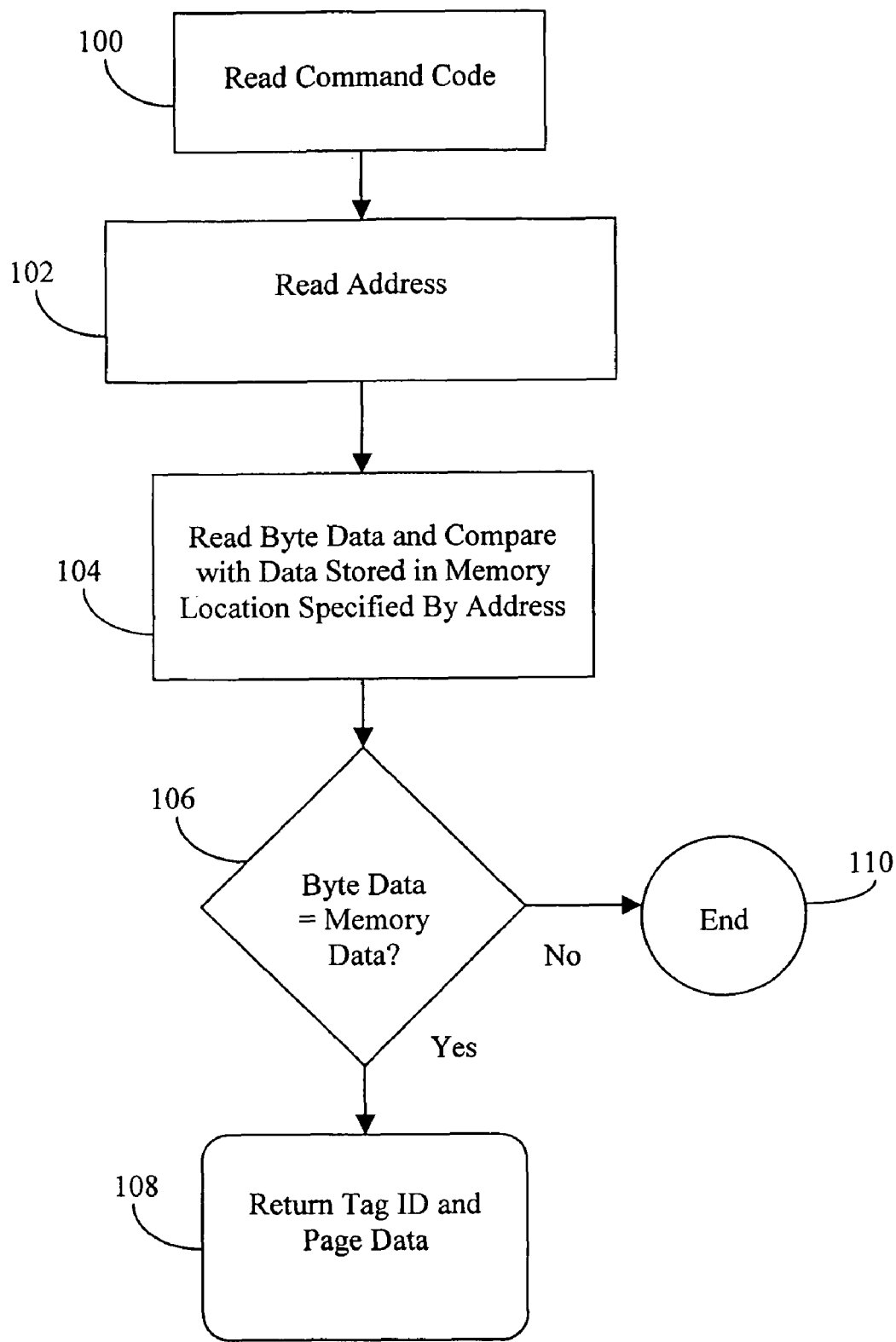
FIG. 3 is a flow chart for the operation of reading Page Data from the tags in accordance with the command signal sequence of FIG. 1.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Turning to the drawings, FIG. 1 shows the tag system 5 having a base station or reader 10 and tags 20. The reader 10 has a processor 12 that interfaces with a memory 14. The processor 12 sends and receives signals to the tags 20 through a reader antenna. The reader 10 may also include a signal generator and receiver that respectively process the signals sent and received by the processor 12. The processor 12 controls the reader 10 and executes the command structure of the present invention. The memory 14 keeps application data, and the tag IDs. The memory 14 can also store the command structure used to communicate with the tags 20.

The tags 20 each include a receiver or processor 22, preferably in the form of an ASIC (application specific integrated circuit) that controls the tag 20 and executes the command structures. The processor 22 receives and sends signals through the tag antenna and controls the processing of those signals. The tags 20 also have a memory 24 that retains the tag ID and Page Data in predetermined memory locations.

As also shown in FIG. 1, the reader 10 transmits a Streamlined Group Select Equal Page Read (SGSEPR) command 30 in accordance with the preferred embodiment of the invention. The SGSEPR command 30 is used to obtain both the tag ID and Page Data from a certain class (group) of tag 20 ASICs in a single command and response transaction.

The first field of the SGSEPR command sequence 30 is the Command Code field 31. The Command Code field 31 identifies the command sequence as being an SGSEPR command 30. The Command Code field is a one-byte value. The next field in the command sequence is the Address field 32. The Address field 32 identifies the memory location in the tag memory 24 that is to be accessed by the tag 20. The next field is the Byte Data field 33, which contains the data that the tag 20 is to compare with the information stored at the memory location identified by the Address field 32. The Starting Address field 34 identifies the memory position of the tag memory 24 that contains the Page Data that is to be returned to the reader 10. The CRC field 35 is a standard cyclic redundancy check field.

Turning next to FIG. 3, the operation of the tag 20 is shown for the SGSEPR command 30 of FIG. 1. The operation is preferably controlled by the tag processor 22. At the first step, step 100, the tag 20 reads the Command Code field 31 of the command sequence 30. The tag 20 identifies the command sequence as being an SGSEPR command 30. At step 102, the tag 20 then reads the Address field 32. The tag 20 preferably stores the Address field 32 in a temporary register location.

At step 104, the tag 20 then reads the Byte Data in the Byte Data field 33, and compares that Byte Data with the data (e.g., a tag group identifier) retrieved from the tag memory location stored at step 102. The tag also reads the Starting Address and CRC field 35. At step 106, if the Byte Data is the same as the tag group identifier data stored in the tag memory 24, the Address is valid (i.e., not a protected address location), and the CRC is accurate, then the tag 20 retrieves the tag ID and the Page Data stored in the tag memory 24 identified by the Starting Address field 34, and returns the tag ID and Page Data to the reader 10, step 108. If the data in the Byte Data field 33 is not the same as the tag group identifier data stored in the tag memory 24, or the Address is not valid, or the CRC is inaccurate, step 106, then the process ends, step 110.

Returning to FIG. 2, a Streamlined Group Select Equal Page Write (SGSEPW) command 40 is shown. The SGSEPW command 40 is generated by the reader 10 and sent to the tag 20 to obtain both the tag ID and to write Page Data to a certain class (group) of tag 20 ASICs in a single command and response transaction. The reader 10 can store the tag ID so that it can be used for other commands that require the tag ID to be present in the command structure.

The first field of the SGSEPW command sequence 40 is the Command Code field 41. The Command Code field 41 identifies the command sequence as being an SGSEPW command 40. The Command Code field 41 is a one-byte value. The next field in the command sequence is the Address field 42. The Address field 42 identifies the memory location in the tag memory 24 that is to be accessed by the tag 20. The next field is the Byte Data field 43, which contains the data that the tag 20 is to compare with the information stored at the memory location identified by the Address field 42. The Starting Address field 44 identifies the memory position of the tag memory 24 that Page Data is to be written to.

Figure 4:
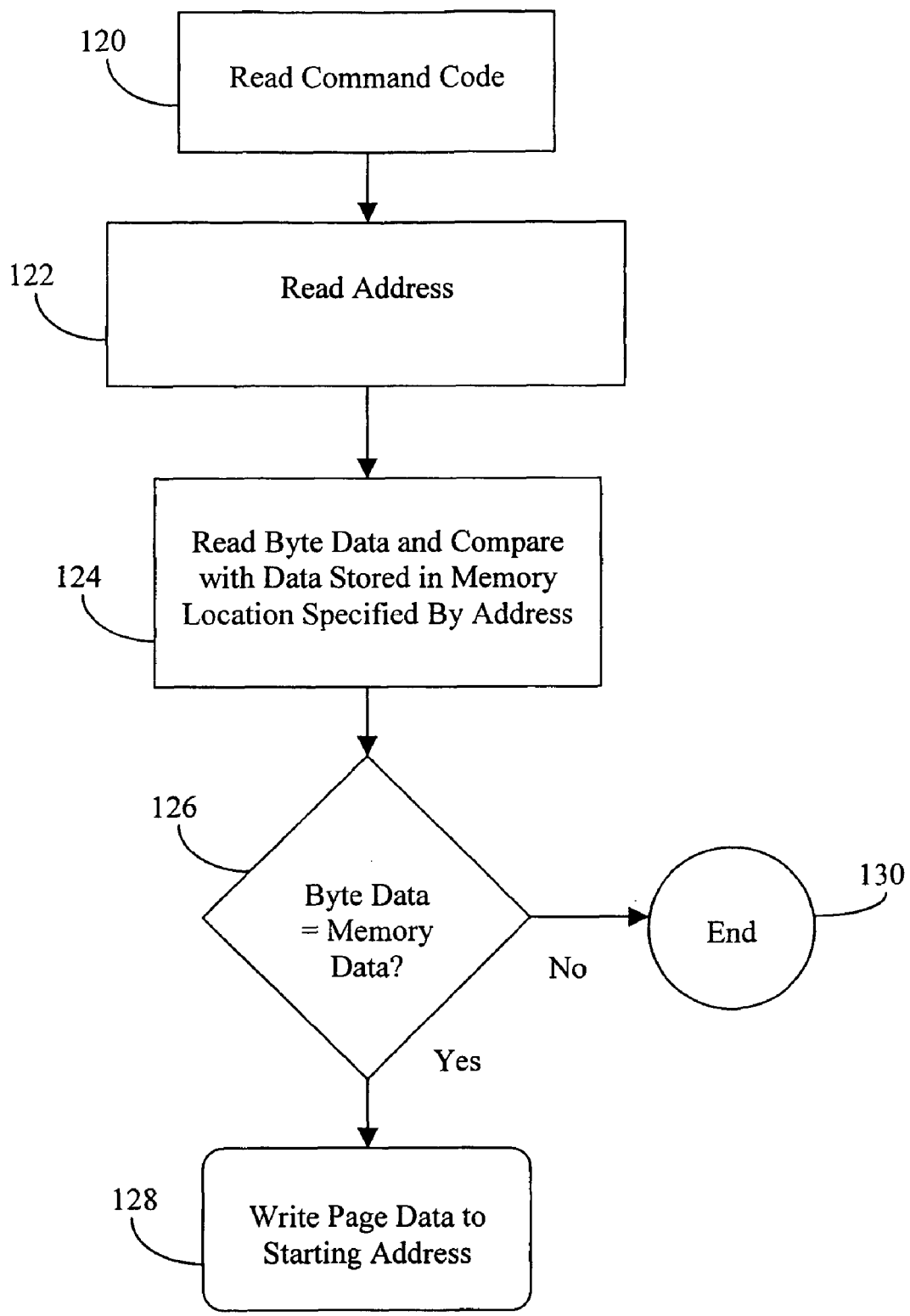
FIG. 4 is a flow chart for the operation of writing Page Data to the tags in accordance with the command signal sequence of FIG. 2.

Turning next to FIG. 4, the operation of the tag 20 is shown for the SGSEPW command 40 of FIG. 2. The operation is preferably controlled by the tag processor 22. At the first step, step 120, the tag 20 reads the Command Code field 41 of the command sequence 40. The tag 20 identifies the command sequence as being an SGSEPW command 40. At step 122, the tag 20 then reads the Address field 42. The tag 20 preferably stores the Address field 32 in a temporary register location.

At step 124, the tag 20 then reads the Byte Data field 43, and compares that Byte Data with the data (e.g., a tag group identifier) retrieved from the tag memory location stored at step 122. The tag also reads the Starting Address field 44, the Page Data from the Page Data field 45, and the CRC (not shown, but follows the Page Data field 45). After this, the ASIC will decide to either respond and perform the write, or terminate the transaction and wait for the next command.

Accordingly, if the Byte Data is the same as the group identifier data stored in the tag memory 24, the Address is valid, and the CRC is accurate, step 126, then the tag 20 writes the Page Data into memory 24 starting at the memory location identified by the Starting Address field 44, step 128. If the Byte Data is not the same as the group identifier data stored in the tag memory 24, the Address is invalid, or the CRC is not accurate, step 126, then the Page Data is not written to the tag memory 24 and the process ends, step 130.

Preferably, the tag writes the Page Data to memory 24, verifies that the Page Data was properly written to the tag memory and then the tag 20 sends a Group Response to the reader 10 that includes the tag ID, the equivalence of its Page Data and a verification signal status. The tag 20 verification signal status verifies to the reader 10 whether or not the Page Data was properly written to the tag memory 24. The tag 10 compares the Page Data in the Page Data field 45 to the Page Data in the memory 24 location specified by the Starting address field 44. If the last write to the tag memory 24 was a good write (that is, there was no error in writing and therefore the verification signal is true), and the Page Data 45 are the same as the Page Data in the memory 24, then the verification response message indicates that the write was a good write and that the data matches.

Otherwise, the tag 20 sends a response message to the reader 10 indicating that the write was not a good write, in which case the reader 10 resends another SGSEPW command 40. An error may result, for instance, where the tag just turned on, so that the initial SGSEPW command signal 40 has not yet resulted in data being written to the tag. Thus, the write command 40 results in the reader 10 being informed that the write has been successful, or that the write had failed. Usually, it requires two write commands 40 before the tag 20 returns a verification message that the write was successfully performed. The first write command 40 will result in the write of the Page Data, and the second write command 40 will verify that the write was successfully performed.

Accordingly, all tags 20 having the same data in memory 24 as the Byte Data field 33, 43 would respond to the command sequence 30, 40 to either read Page Data from the memory location identified by the Starting Address 34, or to write Page Data 45 to the memory at the Starting Address 44.

The Address field 32, 42 can be utilized to select on any area of memory 24 that the reader 10 desires, but the ASIC will preferably only do comparisons on areas of memory that are not in protected areas. That is, the tag 20 determines whether the specified Starting Address field 34, 44 is a protected area of memory as defined by a Memory Access Map which correlates the data in memory to specific memory addresses, to prevent access to confidential information such as passwords and authorization codes and to prevent information from inadvertently being erased.

The tag 20 can include steps to prevent access to (both reading or writing) protected areas of memory 24, such as by verifying that the Address field 32, 42 and Starting Address field 34, 44 are valid. If either address is invalid, no response will be sent and the state will remain the same. An address is invalid, for instance, if it refers to a memory location that is used to retain confidential or protected information. The tag 20 can also use mutual authentication mode and memory lock bits (i.e., an array of the memory that defines whether or not a memory location is locked) to protect those confidential memory locations.

The SGSEPR and SGSEPW commands 30, 40 result in a shorter time frame to read data from and write data to a tag. The reader need not first obtain the tag ID and perform a specific write to the tag with the obtained ID. In addition, the read and write commands 30, 40 do not require any preceding commands (such as to move the tag into an active state) to read data from and write data to the tag 20. This reduces the time required to process signals at both the reader 10 and the tag 20.

The invention especially results in a greater throughput at the reader 10. For instance, to read data from a tag 20 having a 40 Kbps data rate, it takes 1.95 ms for the SGSEPR command 30 to be processed and sent by the reader 10, and 4.4 ms for the response from the tag 20, for a total transaction time of 6.35 ms. To write data to a tag 20 having a 40 Kbps data rate, it takes 3.55 ms for the SGSEPW command 40 to be processed and sent by the reader 10, 15 ms for the data to be written to the tag memory 24, 3 ms for the write response, and then another 3.55 ms to send another SGSEPW command 40 as a verification that the data was written, and 3 ms for the tag to respond with a verification signal. Accordingly, the total transaction time for an 8-byte write operation at a 40 Kbps data rate is 20.9 ms.

In accordance with the preferred embodiment of the invention, the system 5 is used on a variable fee toll road which charges a toll fee based upon the entry and exit locations of a particular vehicle. Accordingly, the toll fee varies depending on the place that the vehicle enters the toll road and the place that the vehicle exits the toll road. As the vehicle enters the toll road, the SGSEPW command 40 is used to write information, such as a location code, to the tag memory 24. The location code identifies the entry location for that vehicle. The reader at the entry location receives the tag ID from the tag response signal, and can send the tag ID to a host computer (not shown) for tracking and billing purposes.

The SGSEPR command 30 is used to read that same location code from the tag 20 as it exits the toll road. The exit location can then determine the proper toll based on the entry location read from the tag. Of course, other suitable arrangements can be made, such as that the entry location reader and exit location reader each independently send the tag ID and location information to a host computer to calculate the toll and bill the tag account holder.

The location code is written to, and read from, the same memory location, so that the Starting Address 34, 44 is the same for both the SGSEPW command 40 and the SGSEPR command 30. For example, if the Starting Address field 34 is 50, then the tag ID, which is located at 00 to 07, is returned together with the data located at memory location 50 to 57. The Starting Address field defines the page of data that will be returned back to the reader. The tag ID is always returned back with the Page Data.

The foregoing description and drawings should be considered as illustrative only of the principles of the invention. The invention may be configured in a variety of manners and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A radio frequency tag that is one of a plurality of radio frequency tags in radio frequency communications range of a base station, comprising:
    a memory having a first memory location retaining a tag group identifier, a second memory location retaining a tag identification code, and a third memory location retaining page data; and
    a processor for receiving from the base station a write signal having an address field identifying the first memory location, a byte data field having byte data, a page address field having a page address, and a page data field having page data comprising a plurality of bytes, said processor retrieving the tag group identifier from the first memory location of said memory in response to the address field, comparing the tag group identifier with the byte data from the byte data field, and comparing the page data from the page data field of said write signal to the page data retained at the third memory location:
        wherein if the byte data matches the tag group identifier from the first data location, and if the page data retained at the third memory location matches the page data from the page data field of the write signal, then sending a response signal to the base station including a verification message indicating a successful write, and
        if the byte data matches the tag group identifier from the first data location, and if the page data retained at the third memory location does not match the page data from the page data field of the write signal, then said processor writes the page data from the page data field of the write signal to the third memory location of said memory, said third memory location being identified by said page address, and indicating an unsuccessful write to the base station.

2. The tag of claim 1, wherein the response signal further includes the tag identification code from the second memory location of said memory.

3. The radio frequency tag of claim 1, wherein said tag does not write said page data if said page address would cause any of said page data to be written into a protected area of said memory.

4. A base station for communicating with a plurality of radio frequency tags, each tag having a memory with a first memory location retaining a tag group identifier, a second memory location retaining a tag identification code, and a third memory location retaining page data, the base station comprising:
- a processor that generates a write signal having an address field identifying the first memory location, a byte data field having byte data that matches the tag group identifier stored in the first memory location of selected ones of the tags, a page address field having a page address, and a page data field having page data comprising a plurality of bytes; and
- an antenna for transmitting the write signal to a plurality of tags, causing the selected ones of the tags to write the page data from the page data field to the third memory location of said memory, said third memory location being identified by said page address;
- in response to the write signal, the plurality of tags retrieving the tag group identifier from the first memory location of said memory in response to the address field, comparing the tag group identifier with the byte data from the byte data field, and comparing the page data from the page data field of said write signal to the page data retained at the third memory location:
  - wherein if the byte data matches the tag group identifier from the first data location, and if the page data retained at the third memory location matches the page data from the page data field of the write signal, then sending a response signal to the base station including a verification message indicating a successful write, and
  - if the byte data matches the tag group identifier from the first data location, and if the page data retained at the third memory location does not match the page data from the page data field of the write signal, then said processor writes the page data from the page data field of the write signal to the third memory location of said memory, said third memory location being identified by said page address, and indicating an unsuccessful write to the base station.

5. The base station of claim 4, wherein the response signal further includes the tag identification code from the second memory location.

6. The base station of claim 4, wherein if the tag does not write said page data, said base station re-attempts to write to the tag.

7. The base station of claim 4, wherein the base station performs a mutual authentication with the tag.

8. A radio frequency tag for communicating with a base station where a plurality of radio frequency tags are in communication range of said base station, comprising:
- a memory having a first memory location retaining a tag group identifier that distinguishes the radio frequency tag from other radio frequency tags having different tag group identifiers, a second memory location retaining a tag identification code, and a third memory location retaining page data; and
- a processor for receiving from the base station a read signal having an address field identifying the first memory location, a page address field having a page address, and a byte data field having byte data, said processor retrieving the tag group identifier from the first memory location of said memory in response to the address field and comparing the tag group identifier with the byte data from the byte data field, wherein if the byte data matches the tag group identifier from the first data location, said processor reads the page data comprising a plurality of bytes from the third memory location of said memory, said third memory location being identified by said page address, and sends a response signal including the page data read from the third memory location and wherein if said page address is invalid, the tag does not send a response;
- the processor receiving from the base station a write signal having an address field identifying the first memory location, a byte data field having byte data, a page address field having a page address, and a page data field having page data comprising a plurality of bytes, said processor retrieving the tag group identifier from the first memory location of said memory in response to the address field of said write command, comparing the tag group identifier with the byte data from the byte data field of said write command, and comparing the page data from the page data field of said write signal to the page data retained at the third memory location:
  - wherein if the byte data from the byte data field of said write command matches the tag group identifier from the first data location, and if the page data retained at the third memory location matches the page data from the page data field of the write signal, then sending a response signal to the base station including a verification message indicating a successful write, and
  - if the byte data from the byte data field of said write command matches the tag group identifier from the first data location, and if the page data retained at the third memory location does not match the page data from the page data field of the write signal, then said processor writes the page data from the page data field of the write signal to the third memory location of said memory, said third memory location being identified by said page address of said write command, and indicating an unsuccessful write to the base station.

9. The tag of claim 8, wherein the response signal further includes the tag identification code from the second memory location of said memory.

10. The tag of claim 8, wherein a protected memory address is an invalid memory address.

11. A base station for communicating with a plurality of radio frequency tags, each tag having a memory with a first memory location retaining a tag group identifier that distinguishes the radio frequency tags from radio frequency tags having a different tag group identifier, a second memory location retaining a tag identification code, and a third memory location retaining page data comprising a plurality of bytes, the base station comprising:
- a processor that generates a read signal having an address field identifying the first memory location, a byte data field having byte data that matches the tag group identifier stored in the first memory location of selected ones of the tags, and a page address field having a page address; and
- an antenna for transmitting the read signal to a plurality of tags, causing the selected ones of the tags to read the page data from the third memory location, said third memory location being identified by said page address, and send a response including the page data read from the third memory location except that if said page address is invalid, the tag does not send a response;
- the plurality of tags receiving from the base station a write signal having an address field identifying the first memory location, a byte data field having byte data, a page address field having a page address, and a page data field having page data comprising a plurality of bytes, said plurality of tags retrieving the tag group identifier from the first memory location of said memory in response to the address field, comparing the tag group identifier with the byte data from the byte data field of said write command, and comparing the page data from the page data field of said write signal to the page data retained at the third memory location:

wherein if the byte data from the byte data field of said write command matches the tag group identifier from the first data location, and if the page data retained at the third memory location matches the page data from the page data field of the write signal, then sending a response signal to the base station including a verification message indicating a successful write, and if the byte data from the byte data field of said write command matches the tag group identifier from the first data location, and if the page data retained at the third memory location does not match the page data from the page data field of the write signal, then said processor writes the page data from the page data field of the write signal to the third memory location of said memory, said third memory location being identified by said page address of said write signal, and indicating an unsuccessful write to the base station.

12. The base station of claim 11, wherein the response signal further includes the tag identification code from the second memory location.

13. The base station of claim 11, wherein a protected memory address is an invalid memory address.

14. The base station of claim 11, wherein the base station performs a mutual authentication with the tag.

* * * * *